(12) United States Patent
McCloghrie et al.

(10) Patent No.: US 7,716,355 B2
(45) Date of Patent: May 11, 2010

(54) METHOD AND APPARATUS FOR PROCESSING SIMPLE NETWORK MANAGEMENT PROTOCOL (SNMP) REQUESTS FOR BULK INFORMATION

(75) Inventors: Keith McCloghrie, Pawling, NY (US); Handral Krishnamurthy Vivek, Bangalore (IN); Vinay Gaonkar, Milpitas, CA (US); Sanjeev C. Joshi, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 1169 days.

(21) Appl. No.: 11/109,539

(22) Filed: Apr. 18, 2005

(65) Prior Publication Data
US 2006/0235971 A1 Oct. 19, 2006

(51) Int. Cl.
*G06F 15/16* (2006.01)
(52) U.S. Cl. ............... 709/230; 709/236; 709/202; 709/217
(58) Field of Classification Search ............... 709/230, 709/236, 202, 204, 217; 340/825; 707/1; 711/1
See application file for complete search history.

(56) References Cited

U.S. PATENT DOCUMENTS 6,240,457 B1 * 5/2001 Bell ..................... 709/230
6,360,258 B1 * 3/2002 LeBlanc ................. 709/223
6,446,079 B2 * 9/2002 Tooker et al. .......... 707/104.1
6,728,768 B1 * 4/2004 Carney .................. 709/224
6,789,082 B2 * 9/2004 Sternin et al. ........... 707/100
2005/0038912 A1 * 2/2005 Ghirardi ................ 709/247
2005/0180387 A1 * 8/2005 Ghirardi ................ 370/351

OTHER PUBLICATIONS

Schoenwaelder, Juergen "GetRange Operation for the Simple Network Management Protocol (SNMP)" [Online], Nov. 28, 2003 [Retrieved on Aug. 28, 2008], Network Management Reasearch Group of IRTF, Internation University Bremen, [http://mail.ibr.cs.tu-bs.de/pipermail/nmrg/2003-November/000828.html].*

(Continued)

*Primary Examiner*—Joseph Thomas
*Assistant Examiner*—Eric W Shepperd
(74) *Attorney, Agent, or Firm*—Hickman Palermo Truong & Becker LLP

(57) ABSTRACT

A method is disclosed for Simple Network Management Protocol (SNMP) bulk information processing. A request for a plurality of object instances stored in a storage space is received. The request specifies a condition and a maximum number of repetitions. The values of one or more object instances of the plurality of object instances are retrieved. The retrieval of object instance values is terminated when the condition is satisfied even though the maximum number of repetitions is not reached. For example, the condition may be specified by one or more pairs of Object Identifier (OID) values, wherein each pair is represented by a starting OID value and an ending OID value. In this example, the condition is satisfied when an OID value of an object instance that is retrieved is not lexicographically between the starting OID value and the ending OID value of any pair of the one or more pairs.

21 Claims, 4 Drawing Sheets

OTHER PUBLICATIONS

McCloghrie, K.; Kastenholz, F. "The Interfaces Group MIB" [Online], Jun. 2000 [Aug. 28, 2008], Internet Society, RFC2863 [http://www.rfc-editor.org/rfc/rfc2863.txt].*

McCloghrie, K. et al., "Management information Base for Network Management of TCP/IP-based internets: MIB-II," Network Working Group, RFC 1213, Mar. 1991, 63 pages.

Pras, Aiko et al., "The Simple Times," The Quarterly Newsletter of SNMP Technology, Comment, and Events—vol. 10, No. 1, Dec. 2002, 37 pages.

Presuhn, R. et al., "Version 2 of the Protocol Operations for the Simple Network Management Protocol (SNMP)," Network Working Group, RFC 3416, Dec. 2002, 28 pages.

* cited by examiner

IP Net-To-Media Table 120

| Interface Number 121 | Network Address 122 | Physical Address 123 | Type 124 |
|---|---|---|---|
| 1 | 127.0.0.1 | 00:15:01:61 | static |
| 1 | 10.1.1.2 | 00:15:01:61 | dynamic |
| 2 | 4.1.24.112 | 00:11:78:11 | static |
| 4 | 11.0.0.1 | 00:10:23:04 | dynamic |
| 6 | 9.0.12.2 | 00:28:01:14 | dynamic |

200 Get-Limited-Bulk PDU

| PDU Type 202 | Request ID 204 | Non-repeaters 206 | Max-repetitions 208 | OID 1 210 | ... | OID N 212 | StartOID -EndOID Pair1 214 | ... | StartOID -EndOID PairN 216 |

METHOD AND APPARATUS FOR PROCESSING SIMPLE NETWORK MANAGEMENT PROTOCOL (SNMP) REQUESTS FOR BULK INFORMATION

FIELD OF THE INVENTION

The present invention generally relates to network management. The invention relates more specifically to a method and apparatus for Simple Network Management Protocol (SNMP) bulk information processing.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The Simple Network Management Protocol (SNMP) is a network protocol for exchanging network management information between network systems. The current version of the Protocol Operations for SNMP, version 2, is defined in RFC3416 published by the Internet Engineering Task Force (IETF) in December 2002. According to the SNMP specification, network management information is exchanged in data units called Protocol Data Units (PDUs). Some of the PDUs defined in RFC3416 include GetRequest-PDU, GetNextRequest-PDU, GetBulkRequest-PDU, Response-PDU, SetRequest-PDU, InformRequest-PDU, SNMPv2-Trap-PDU, and Report-PDU. The PDUs are included in messages exchanged between SNMP management systems and network elements that execute SNMP agents. For example, an SNMP management system, executing on a system connected to the network, requests in a message including a GetBulkRequest-PDU, network information from an SNMP agent that is executing on a network element which might be the same or a different system. The SNMP agent receives the message with the GetBulkRequest-PDU from the SNMP management system, retrieves the requested information in a Response-PDU, and returns the Response-PDU in a message to the SNMP management system.

The network management information exchanged over SNMP is usually stored in Management Information Bases (MIBs) that are typically managed by SNMP agents. The MIB is organized as a tree of objects of management information. A specific instance from an object of management information is called an SNMP variable or an object instance. An object in the MIB is identified by an object identifier (OID), and the value of the OID identifies an object instance. An OID value is an ordered sequence of at least two components: an OID prefix identifying an object, and an OID suffix identifying a particular instance of the object. A scalar object is an object that has exactly one instance at any one point in time. A columnar object is an object defined to have zero, one, or more instances at any given time, and usually represents a column in a table object that stores management information. An object instance has a value, and the pairing of the OID name of an object instance and the object instance's value is referred to as an SNMP variable binding (or a var-bind).

An object instance of a scalar object is identified by an OID value whose prefix is the OID of the object and whose suffix is the number zero. For example, the OID value for an object instance of the scalar object "sysUpTime" is "sysUpTime.0".

Identification of instances of columnar objects that are included in a table object is accomplished through indexing schemes. An indexing scheme uniquely identifies each instance of the columnar object. As an example, consider the "ipNetToMediaTable" table object defined in RFC1213, which was published by IETF in March 1991. The "ipNetToMediaTable" table object has as its columns the columnar objects "ipNetToMediaIfIndex", "ipNetToMediaNetAddress", "ipNetToMediaPhysAddress", and "ipNetToMediaType". The indexing scheme defined for this table object includes the columnar objects "ipNetToMediaIfIndex" and "ipNetToMediaNetAddress". Referring to the example of an "ipNetToMediaTable" object depicted in FIG. 1A, under this indexing scheme the object instance value of columnar object "ipNetToMediaPhysAddress" in the second row of the table would be identified as "ipNetToMediaPhysAddress.1.10.1.1.2", where the prefix "ipNetToMediaPhysAddress" is the OID of columnar object "ipNetToMediaPhysAddress", and the suffix "1.10.1.1.2" is the concatenated combination of the values of columnar objects "ipNetToMediaIfIndex" and "ipNetToMediaNetAddress" for the second row in table object "ipNetToMediaTable".

SNMP provides the GetBulkRequest-PDU for retrieval in bulk of network management information from a MIB. The GetBulkRequest-PDU includes the following parameters: a non-repeaters counter (N), a max-repetitions counter (M), and a list of OIDs identifying the object instances whose values need to be retrieved. The GetBulkRequest-PDU is processed in the following way: one object instance value is retrieved for each of the first N OIDs in the request, and M object instance values are retrieved for each of the remaining OIDs in the request. As a result, the GetBulkRequest-PDU is useful for retrieving a potentially large amount of information, for example, from table objects in the MIB.

SNMP management systems often would prefer to use a single GetBulkRequest-PDU to an SNMP agent to retrieve all of the data of a table object in the MIB. However, most of the time an SNMP management system is unaware of the number of entries in a MIB table before the system sends a request to the SNMP agent. Thus, the selection of the max-repetitions counter (M) becomes relevant to the effective retrieval of information, especially when the information is stored in large tables. A max-repetitions counter (M) that is too small may cause the SNMP management system to send too many GetBulkRequest-PDU retrieval requests, which in turn would cause a non-optimal utilization of the network bandwidth and unnecessary processing overhead at both the SNMP management system and the SNMP agent.

A max-repetitions counter (M) that is too big may cause an SNMP agent to retrieve, process, and send back to the SNMP management system a large amount of information that was implicitly requested even though it was not wanted. This is known as the so-called "overshoot" problem. In some situations, the "overshoot" problem can cause significant processing overhead at both the SNMP agent and the SNMP management system, and can increase the information retrieval latency. The reason for the "overshoot" problem is that the number of retrieved object instance values is based only on the max-repetitions counter (M), and the GetBulkRequest-PDU processing always attempts to honor this value regardless of whether the end of a table is reached. For example, when M is large and the SNMP management system is attempting to retrieve a table that has only a few entries, GetBulkRequest-PDU processing does not stop at the end of the table, but continues to retrieve, until the value of M is reached or until the maximum allowed size for a Response-PDU is reached, the values of object instances having OID values that lexicographically follow the OID value of the last entry in the table. In other words, GetBulkRequest-PDU processing honors the value M of the max-repetitions counter by retrieving the object instance values for OIDs that follow, in dictionary order, the OIDs specified in the request.

Based on the foregoing, there is a clear need for an SNMP bulk processing technique that effectively optimizes the use of network bandwidth and that addresses the "overshoot" problem.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
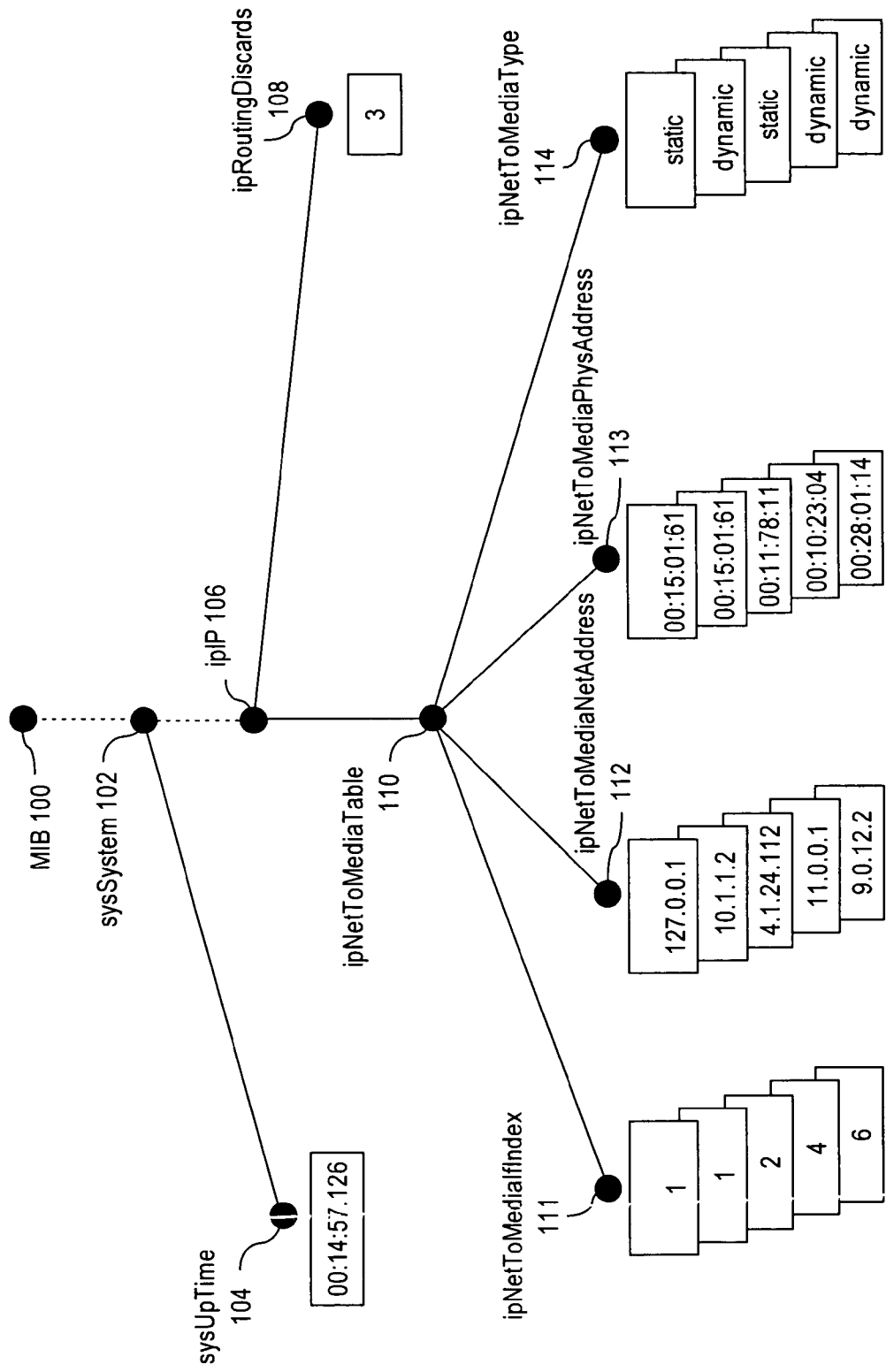
FIG. 1A is a block diagram of a portion of a Management Information Base (MIB) that may be used to illustrate one embodiment.

A method and apparatus for Simple Network Management Protocol (SNMP) bulk information processing is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Method of SNMP Bulk Information Processing
   2.1 Structural and Functional Overview
   2.2 Example of MIB Information Retrieval According to an Embodiment
   2.3 Alternative Embodiments
3.0 Implementation Mechanisms—Hardware Overview
4.0 Extensions and Alternatives 1.0 General Overview Techniques are provided for managing information in a storage space. In one aspect, a request for a plurality of object instances stored in a storage space is received. The request specifies one or more conditions and a maximum number of repetitions. The values of one or more object instances of the plurality of object instances are retrieved. The retrieval of object instance values is terminated when the one or more conditions are satisfied even though the maximum number of repetitions is not reached.

In one feature of the aspect, the request is created by and sent from a Simple Network Management Protocol (SNMP) management system to an SNMP agent, the storage space is a SNMP Management Information Base (MIB), and the aspect further comprises creating and sending a response to the SNMP management system, which response includes the values of the one or more object instances. The MIB may be stored in a persistent storage, such as, for example, a hard disk, or in volatile memory. In some features, the storage space may be any data structure for storing information in persistent storage (such as, for example, a hard disk) or in volatile storage (such as, for example, a Random Access Memory). The storage space may be organized in a variety of ways including, but not limited to, as a file, as a directory of files, as a database, as a table, as an array, as a list of items, as a heap, as a queue, as tree of items, as one or more objects instantiated from object-oriented classes, and as one or more name-value pairs.

In a feature of this aspect, each condition of the one or more conditions is associated with a pair of Object Identifier (OID) values of one or more pairs of OID values, where each pair of OID values is represented by a starting OID value and an ending OID value. A particular condition is satisfied when an OID value of an object instance that is retrieved is lexicographically greater than a particular ending OID value of a particular pair of OID values that is associated with the particular condition.

Techniques are also provided for managing information in a MIB. In one aspect, a request that includes one or more pairs of OID values is received at an SNMP agent. Each pair of the one or more pairs is represented by a starting OID value and an ending OID value. The values of a set of object instances of a plurality of object instances in the MIB, which are specified in the request, are retrieved. The set of object instances is determined based on the one or more pairs of OID values. After the values of object instances in the set of object instances are retrieved, a response that includes the values is sent to SNMP management system that issued the request.

In a feature of this aspect, an object instance is identified as a member of the set of object instances if the OID value of the object instance is lexicographically greater than a particular starting OID value and lexicographically lesser than or equal to a particular ending OID value, where the particular starting OID value and the particular ending OID value represent a particular pair of the one or more pairs of OID values included in the request.

In one feature of the aspect, the request includes a maximum repetitions counter indicating the number of requested values for object instances in the set of object instances. The request also includes a non-repeaters counter indicating the number of requested values for one or more scalar or columnar object instances of the plurality of object instances that are to be retrieved just once. Retrieving the values of the set of object instances further comprises terminating the retrieval when a condition is satisfied. The condition may be at least one of: (a) the number of retrieved object instance values of object instances in the set of object instances is equal to the maximum repetitions counter; (b) an OID value of an object instance that is to be retrieved next is lexicographically greater than a particular ending OID value, wherein a particular starting OID value and the particular ending OID value represent any pair of the one or more pairs; and (c) the total size of the retrieved values of the set of object instances exceeds the maximum SNMP message size for a response message.

In other aspects, the invention encompasses a computer apparatus and a machine-readable medium configured to carry out the foregoing steps.

2.0 Method Of SNMP Bulk Information Processing

2.1 Structural and Functional Overview

Figures 1B, 2:
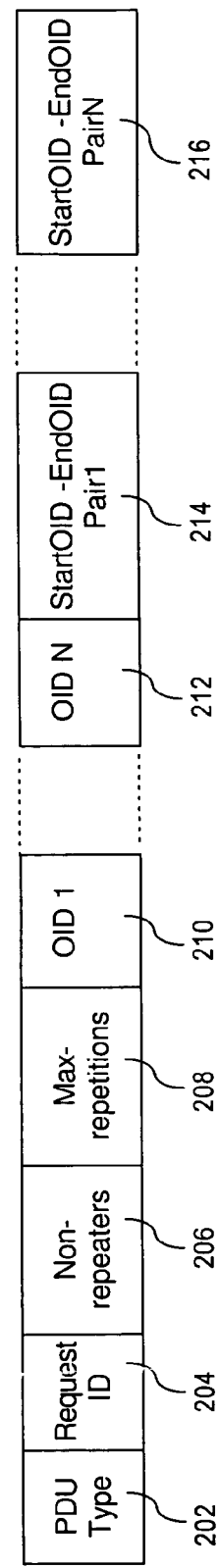
FIG. 1B is a block diagram that illustrates a table of information corresponding to a portion of the MIB that is depicted in FIG. 1A.
FIG. 2 is a block diagram that illustrates the structure of a Get-Limited-Bulk Protocol Data Unit (PDU) according to one embodiment.

FIG. 2 is a block diagram that illustrates the structure of a Get-Limited-Bulk Protocol Data Unit (PDU) according to one embodiment. GetLimitedBulk-PDU 200 includes PDU Type field 202, Request ID field 204, Non-Repeaters field 206, Max-Repetitions field 208, one or more fields, such as fields 210 and 212, for one or more OID values of scalar or columnar object instances, and one or more fields, such as fields 214 and 216, for one or more pairs of starting and ending OID values.

PDU Type field 202 stores a value that uniquely distinguishes a GetLimitedBulk-PDU from other SNMP PDUs. Request ID field 204 stores a counter associated with a particular GetLimitedBulk-PDU request that is sent to an SNMP agent. Non-Repeaters field 206 is the same non-repeaters counter (N) that is defined for the GetBulkRequest-PDU and indicates the number of scalar or columnar object instance values that should be retrieved no more than once for a particular GetLimitedBulk-PDU request. Max-Repetitions field 208 is the same max-repetitions counter (M) that is defined for GetBulkRequest-PDU and indicates the maximum number of times that values of object instances beyond those specified in Non-Repeaters field 206 should be retrieved.

One or more OID values of scalar or columnar object instances may be stored in one or more fields of GetLimitedBulk-PDU 200, such as fields 210 and 212. In an embodiment, the number of OID values of object instances specified in a GetLimitedBulk-PDU request may be equal to the value specified in the Non-Repeaters field 206 included in the request.

One or more StartOID-EndOID value pairs may be stored in one or more fields of GetLimitedBulk-PDU 200, such as fields 214 and 216. A StartOID-EndOID value pair included in a GetLimitedBulk-PDU request specifies a range of object instances for which object instance values should be retrieved. Any particular GetLimitedBulk-PDU request may include one or more StartOID-EndOID value pairs. Furthermore, object instance values will be retrieved only for objects that are lexicographically between any StartOID-EndOID value pair that is included in the GetLimitedBulk-PDU request.

In operation, an embodiment using a GetLimitedBulk-PDU processes non-repeaters object instances in the same way as the GetBulkRequest-PDU, that is, the values for the first N object instances specified in the request are retrieved just once, where N is the value specified in the Non-Repeaters field of the GetLimitedBulk-PDU request.

The rest of the OID values requested in the GetLimitedBulk-PDU are processed based on the one or more StartOID-EndOID value pairs specified in the request. For each StartOID-EndOID value pair, the StartOID value specifies the object instance at which processing starts for retrieving the values of repeating object instances. The EndOID specifies the object instance that is the upper bound where retrieving the values of repeating object instances stops. In one embodiment, at most M object instance values are retrieved for object instances having OID values that are lexicographically lesser than the EndOID value, where M is the value specified in the Max-Repetitions field of the GetLimitedBulk-PDU request. In another embodiment, at most M object instance values may be retrieved for object instances having OID values that are lexicographically lesser than or equal to the EndOID value.

In one embodiment, object instance value retrieval for a GetLimitedBulk-PDU request stops when either M object instance values after the object instance having an StartOID value are retrieved, or when the OID value of the object instance that is to be retrieved is lexicographically greater than the EndOID value.

The techniques described herein may be used to efficiently and optimally request and retrieve object instance values from arbitrarily large tables. For example, in one embodiment, in order to retrieve only the object instance values in a table object of a MIB, a SNMP management system needs to specifies the OID value of the first columnar object of the table in a StartOID value of the GetLimitedBulk-PDU request and the OID value of the object that follows lexicographically immediately after the last columnar object of the table in a EndOID value of the request. In this embodiment, even if the Non-Repeaters value M (which is stored in the Non-Repeaters field of the GetLimitedBulk-PDU) is much larger than the number of object instance values stored in the table object, object instance values for objects instances that are beyond the table object in the MIB will not be retrieved and returned in the response because such object instances have OID values that are lexicographically greater than the EndOID value. Thus, the "overshoot" problem is avoided.

Figure 3:
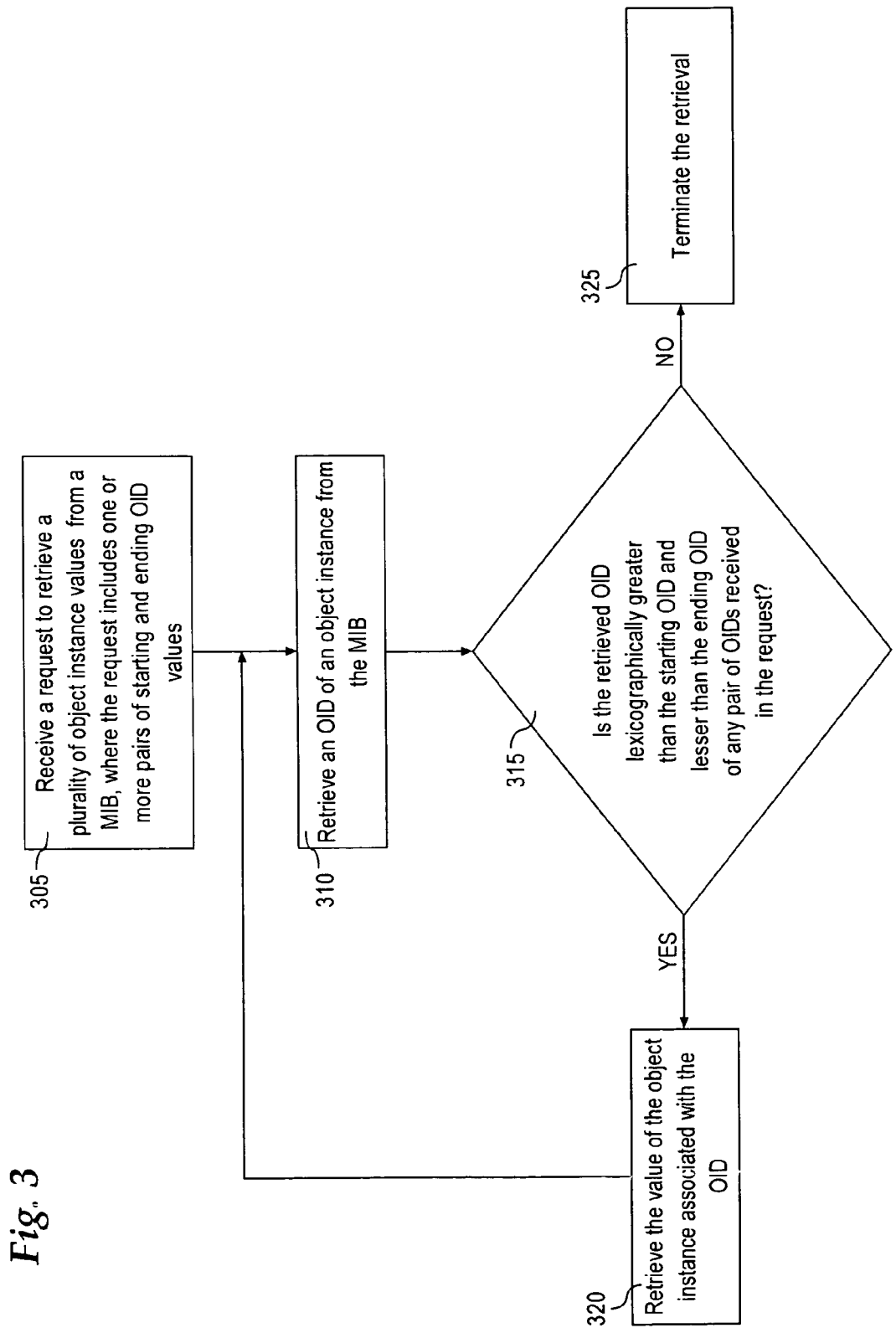
FIG. 3 is a flow diagram that illustrates a high level overview of one embodiment of a technique for SNMP bulk information processing.

FIG. 3 is a flow diagram that illustrates a high level overview of one embodiment of a technique for SNMP bulk retrieval of information. FIG. 3 is described with reference to an SNMP agent, an SNMP management system, and a MIB, although the techniques described herein are not limited to such an implementation.

In step 305, an SNMP agent managing a MIB receives a request from an SNMP management system to retrieve a plurality of object instance values from the MIB, where the request includes one or more pairs of starting and ending OID values. The request received at the SNMP agent may also include one or more parameters, such as, for example, a Non-Repeaters counter indicating that one or more OID values of object instances need to be retrieved just once, and a Max-Repetitions counter.

In step 310, an OID value of an object instance is retrieved from the MIB, where the OID value is lexicographically greater than the starting OID value of a particular pair of OID values that is included in the request.

In step 315, a determination is made whether the retrieved OID value is lexicographically greater than the starting OID value and lexicographically lesser than the ending OID value of any pair of starting and ending OID values specified in the request. If the retrieved OID value is not lexicographically between the starting and ending OID values of any pair of OID values, then in step 325 the retrieval is terminated.

If in step 315 the retrieved OID value is lexicographically greater than the starting OID value and lexicographically lesser than the ending OID value of a particular pair of starting and ending OID values, then in step 320 the value of the object instance associated with the retrieved OID value is retrieved. The retrieval then proceeds to step 310 to retrieve the OID value that lexicographically follows the currently retrieved OID value.

The techniques described herein are not limited to being implemented only on a specific portion of a MIB, and therefore any information in any MIB, presently existing or subsequently developed or defined, may be retrieved by making use of these techniques.

2.2 Examples of MIB Information Retrieval According to an Embodiment

FIG. 1B is a block diagram that illustrates a table of information that may be stored on a computer system that makes use or supports an SNMP MIB. Specifically, "IP Net-To-Media" table 120 includes "Interface Number" column 121, "Network Address" column 122, "Physical Address" column 123, and "Type" column 124. Further, the information in "IP Net-To-Media" table 120 is organized in five rows, where each row includes a value for each one of columns 121 to 124.

FIG. 1A is a block diagram of a portion of the SNMP MIB on the computer system that represents the "IP Net-To-Media" table 120 depicted in FIG. 1B. In particular, MIB 100 includes, among other objects, object "sysSystem" 102 and object "ipIP" 106. Object "sysSystem" 102 includes scalar object "sysUpTime" 104 that has a value of "00:14:57.126", which indicates the time since the network management portion of the system was last re-initialized. Object "ipIP" 106 includes scalar object "ipRoutingDiscards" 108 that has a value of "3", which indicates the number of network routes lost due to a lack of buffer space.

Object "ipIP" 106 also includes table object "ipNetToMediaTable" 110 that represents table "IP Net-To-Media" 120 depicted in FIG. 1B. As represented in MIB 100, table object "ipNetToMediaTable" 110 includes: columnar object "ipNetToMediaIfIndex" 111 (which corresponds to "Interface Number" column 121 of "IP Net-To-Media" table 120 depicted in FIG. 1B), columnar object "ipNetToMediaNetAddress" 112 (which corresponds to "Network Address" column 122 of "IP Net-To-Media" table 120 depicted in FIG. 1B), columnar object "ipNetToMediaPhysAddress" 113 (which corresponds to "Physical Address" column 123 of "IP Net-To-Media" table 120 depicted in FIG. 1B), and columnar object "ipNetToMediaType" 114 (which corresponds to "Type" column 124 of "IP Net-To-Media" table 120 depicted in FIG. 1B). Furthermore, table object "ipNetToMediaTable" 110 uses the same indexing scheme described in *RFC*1213 for MIBs that store IP Net-To-Media address information, that is, the values of columnar object instances "ipNetToMediaIfIndex" and "ipNetToMediaNetAddress" are used as OID suffixes in order to uniquely identify the object instances in the table object.

In one example of the techniques described herein, suppose that an SNMP management system wants to retrieve the object instance values of columnar objects "ipNetToMediaNetAddress" and "ipNetToMediaPhysAddress" for all rows of table object "ipNetToMediaTable" 110 that is maintained by an SNMP agent in MIB 100.

In order to accomplish this, according to one embodiment the SNMP management system sends the following GetLimitedBulk-PDU request to the SNMP agent:

```
GetLimitedBulk-PDU (
            Non-Repeaters = 1, Max-Repetitions = 1200,
            sysUpTime,
            ipNetToMediaNetAddress, ipNetToMediaType
            )
```

Since the SNMP management system does not know how many rows of information are included in table object "ipNetToMediaTable" 110, the SNMP management system requests retrieval of object instance values from the first 1200 rows of the table object by specifying the value "1200" for the Max-Repetitions counter. The SNMP management system also requests the value of object instance "sysUpTime" 104 by specifying, in the GetLimitedBulk-PDU, the OID "sysUpTime" of the object and the value of "1" for the Non-Repeaters counter. By including in the GetLimitedBulk-PDU request the pair of columnar objects OIDs <"ipNetToMediaNetAddress", "ipNetToMediaType">, the SNMP management system specifies that only the values of columnar objects that are lexicographically greater than "ipNetToMediaNetAddress" and lexicographically less than "ipNetToMediaType" are wanted.

According to this embodiment, in response to the above GetLimitedBulk-PDU, the SNMP agent managing MIB 100 creates and returns the following SNMP Response-PDU:

```
Response-PDU (
            (sysUpTime.0 = "00:14:57.126"),
            (ipNetToMediaNetAddress.1.127.0.0.1 = "127.0.0.1"),
                (ipNetToMediaPhysAddress.1.127.0.0.1 = "00:15:01:61"),
            (ipNetToMediaNetAddress.1.10.1.1.2 = "10.1.1.2"),
                (ipNetToMediaPhysAddress.1.10.1.1.2 = "00:15:01:61"),
            (ipNetToMediaNetAddress.2.4.1.24.112 = "4.1.24.112"),
                (ipNetToMediaPhysAddress.2.4.1.24.112 = "00:11:78:11"),
            (ipNetToMediaNetAddress.4.11.0.0.1 = "11.0.0.1"),
                (ipNetToMediaPhysAddress.4.11.0.0.1 = "00:10:23:04"),
            (ipNetToMediaNetAddress.6.9.0.12.2 = "9.0.12.2"),
                (ipNetToMediaPhysAddress.6.9.0.12.2 = "00:28:01:14"),
            )
```

In this example, the Response-PDU includes the values of object instances with OID values lexicographically greater than "ipNetToMediaNetAddress", such as, for example, "ipNetToMediaNetAddress.1.127.0.0.1", and lexicographically lesser than "ipNetToMediaType", such as for example, "ipNetToMediaPhysAddress.6.9.0.12.2". Instead of retrieving a total of 1200 object instance values as specified in the Max-Repetitions counter of the GetLimitedBulk-PDU request, only the object instance values of columnar objects "ipNetToMediaNetAddress" 112 and "ipNetToMediaPhysAddress" 113 are retrieved because the retrieval is terminated when the OID value of the object instance that lexicographically follows the "ipNetToMediaPhysAddress" object is reached. In other words, the retrieval is terminated when an OID value of "ipNetToMediaType.1.127.0.0.1" is reached, which OID value represents the columnar object instance "ipNetToMediaType" 114 in the first row of table object "ipNetToMediaTable" 110.

In another example, suppose that the SNMP management application wants to retrieve: (1) the values of the object instances of columnar objects "ipNetToMediaIfIndex" 111 and "ipNetToMediaNetAddress" 112 of table object "ipNetToMediaTable" 110, and (2) the values of the object instances of columnar object "ipNetToMediaType" 114 of table object "ipNetToMediaTable" 110. In this example, the SNMP management system sends the following GetLimitedBulk-PDU request to the SNMP agent:

```
GetLimitedBulk-PDU (
            Non-Repeaters = 0, Max-Repetitions = 1200,
            ipNetToMediaIfIndex,
            ipNetToMediaPhysAddress,
            ipNetToMediaType, ipRoutingDiscards
            )
```

In response to this GetLimitedBulk-PDU, the SNMP agent managing MIB 100 creates and returns the following SNMP Response-PDU:

```
Response-PDU (
            (ipNetToMediaIfIndex.1.127.0.0.1 = "1"),
                (ipNetToMediaNetAddress.1.127.0.0.1 =
                "127.0.0.1"),
```

-continued

```
    (ipNetToMediaIfIndex.1.10.1.1.2 = "1"),
        (ipNetToMediaNetAddress.1.10.1.1.2 =
          "10.1.1.2"),
    (ipNetToMediaIfIndex.2.4.1.24.112 = "2"),
        (ipNetToMediaNetAddress.2.4.1.24.112 =
          "4.1.24.112"),
    (ipNetToMediaIfIndex.4.11.0.0.1 = "4"),
        (ipNetToMediaNetAddress.4.11.0.0.1 =
          "11.0.0.1"),
    (ipNetToMediaIfIndex.6.9.0.12.2 = "6"),
        (ipNetToMediaNetAddress.6.9.0.12.2 =
          "9.0.12.2"),
    (ipNetToMediaType.1.127.0.0.1 = "static"),
    (ipNetToMediaType.1.10.1.1.2 = "dynamic"),
    (ipNetToMediaType.2.4.1.24.112 = "static"),
    (ipNetToMediaType.4.11.0.0.1 = "dynamic"),
    (ipNetToMediaType.6.9.0.12.2 = "dynamic"),
)
```

In this example, with respect to the pair of starting and ending OID values of <ipNetToMediaIfIndex, ipNetToMediaPhysAddress>, the Response-PDU includes the values of object instances with OID values lexicographically greater than "ipNetToMediaIfIndex", such as, for example, "ipNetToMediaIfIndex.1.127.0.0.1", and lexicographically lesser than "ipNetToMediaPhysAddress", such as for example, "ipNetToMediaNetAddress.6.9.0.12.2". With respect to the pair of starting and ending OID values of <ipNetToMediaType, ipRoutingDiscards>, the Response-PDU includes the values of object instances with OID values lexicographically greater than "ipNetToMediaType", such as, for example, "ipNetToMediaType.1.127.0.0.1", and lexicographically lesser than "ipRoutingDiscards", such as for example, "ipNetToMediaType.6.9.0.12.2". In this example, instead of retrieving a total of 1200 object instance values as specified in the Max-Repetitions counter of the GetLimitedBulk-PDU request, only the object instance values of columnar objects "ipNetToMediaIfIndex" 111, "ipNetToMediaNetAddress" 112, and "ipNetToMediaType" 114 are retrieved. Specifically, the retrieval based on the first pair of OID values specified in the GetLimitedBulk-PDU is terminated when the OID value of the object instance that lexicographically follows the "ipNetToMediaNetAddress" object is reached, i.e. when the retrieval reaches an object instance with OID value of "ipNetToMediaPhysAddress.1.127.0.0.1". Similarly, the retrieval based on the second pair of OID values specified in the GetLimitedBulk-PDU is terminated when the OID value of the object instance that lexicographically follows the "ipNetToMediaType" object is reached, i.e. when the retrieval reaches an object instance with OID value of "ipRoutingDiscards.0".

2.3 Alternative Embodiments

In some embodiments, the retrieval of object instance values in response to a SNMP retrieval request may also be terminated if the number of retrieved object instance values has reached the value of a Max-Repetitions counter that is specified in the request. In other embodiments, the retrieval may also be terminated if the currently retrieved OID value is lexicographically greater than the ending OID value of a particular pair of OID values of the pairs of OID values. In yet other embodiments, the retrieval may be terminated when the total size of the retrieved object instance values exceeds the maximum allowed SNMP message size for a response message. Thus, the techniques for retrieval of SNMP bulk information described herein may be used in combination with each other, and the examples of retrieval termination conditions provided herein are to be regarded in an illustrative, rather than a restrictive sense.

For example, all three retrieval termination conditions mentioned above may be included in an embodiment. In this embodiment, the retrieval of object instance values may be terminated if: (a) the number of retrieved object instance values is equal to the value of the Max-Repetitions counter included in the SNMP retrieval request, or (b) the OID value of the object instance that is to be retrieved next is lexicographically greater than a particular ending OID value of a particular pair of OID values specified in the request, or (c) the total size of the retrieved object instance values exceeds the maximum allowed size for a response message. In addition, the retrieval of object instance values may be terminated if all or any combination of the above conditions is satisfied.

In this embodiment, if retrieval termination condition (a) is satisfied, then the Response-PDU will include a number of object instance values that is equal to the number of Max-Repetitions counter specified in the request. This may indicate to the SNMP management system, which requested the retrieval, that there may be some object instances with OID values in the range of starting and ending OID values for which the object instance values have not yet been retrieved. The SNMP management system may then send a new retrieval request by including the last OID value included in the Response-PDU as a starting OID value in the new request in order to retrieve the values of the remaining object instances. If retrieval condition (c) is satisfied, then the Response-PDU will have a total size that is equal, or very close, to the maximum size allowed for a Response-PDU. This also may indicate to the SNMP management system that there may be some object instances with OID values in the range of starting and ending OID values for which the object instance values have not yet been retrieved. The SNMP management system may then send a new retrieval request by including the last OID value included in the Response-PDU as a starting OID value in the new request in order to retrieve the values of the remaining object instances. If retrieval condition (b) is satisfied for every pair of starting and ending OID values specified in the request, then the SNMP management system knows that that there are no object instances with OID values in the ranges of any starting and ending OID pair for which the object instance values have not yet been retrieved.

According to one embodiment, an object instance value of an object instance is retrieved if its OID value is lexicographically greater than a starting OID value specified in an OID value pair in a SNMP retrieval request, and is lexicographically lesser than or equal to the ending OID value of the OID value pair. For example, referring to FIG. 1A, according to this embodiment a request to retrieve the values of all object instances in table object "ipNetToMediaTable" 110 may include the OID values of "ipNetToMediaIfIndex.1.127.0.0.1" and "ipNetToMediaType.6.9.0.12.2" as an OID value pair, where "ipNetToMediaIfIndex.1.127.0.0.1" is the first object instance and "ipNetToMediaType.6.9.0.12.2" is the last object instance stored in table object "ipNetToMediaTable" 110. The request is as follows:

```
GetLimitedBulk-PDU (
            Non-Repeaters = 0, Max-Repetitions = 1200,
            ipNetToMediaIfIndex.1.127.0.0.1,
            ipNetToMediaType.6.9.0.12.2
)
```

According to another embodiment, an object instance value of an object instance is retrieved if its OID value is lexicographically greater than a starting OID value specified in an OID value pair in a SNMP retrieval request, and is lexicographically lesser than the ending OID value of the OID value pair. For example, referring to FIG. 1A, according to this embodiment a request to retrieve the values of all object instances in table object "ipNetToMediaTable" 110 may include the OID values of "ipNetToMediaIfIndex.1.127.0.0.1" and "ipRoutingDiscards" as an OID value pair, where "ipNetToMediaIfIndex.1.127.0.0.1" is the first object instance of table object "ipNetToMediaTable" 110 and the "ipRoutingDiscards" object is the object that lexicographically follows the columnar objects of the table object. The request is as follows:

```
GetLimitedBulk-PDU (
                Non-Repeaters = 0, Max-Repetitions = 1200,
                ipNetToMediaIfIndex.1.127.0.0.1,
                ipRoutingDiscards
                )
```

According to another embodiment, an object instance value of an object instance is retrieved if its OID value is lexicographically greater than a starting OID value specified in an OID value pair in a SNMP retrieval request, and is lexicographically lesser than or equal to the ending OID value of the OID value pair. For example, referring to FIG. 1A, according to this embodiment a request to retrieve the values of all object instances in table object "ipNetToMediaTable" 110 may include the OID values of "ipNetToMediaIfIndex" and "ipNetToMediaType.6.9.0.12.2" as an OID value pair, where the "ipNetToMediaIfIndex" object is the first columnar object of table object "ipNetToMediaType" 110 and "ipNetToMediaType.6.9.0.12.2" is the last object instance of the table object. The request is as follows:

```
GetLimitedBulk-PDU (
                Non-Repeaters = 0, Max-Repetitions = 1200,
                ipNetToMediaIfIndex,
                ipNetToMediaType.6.9.0.12.2
                )
```

Based on the foregoing, it is evident that different embodiments are not limited to any particular method of comparing the particular OID value of any particular object instance to the pair of starting and ending OID values specified in a SNMP retrieval request. For this reason, the examples described herein are to be regarded in an illustrative rather than a restrictive sense.

3.0 Implementation Mechanisms—Hardware Overview

Figure 4:
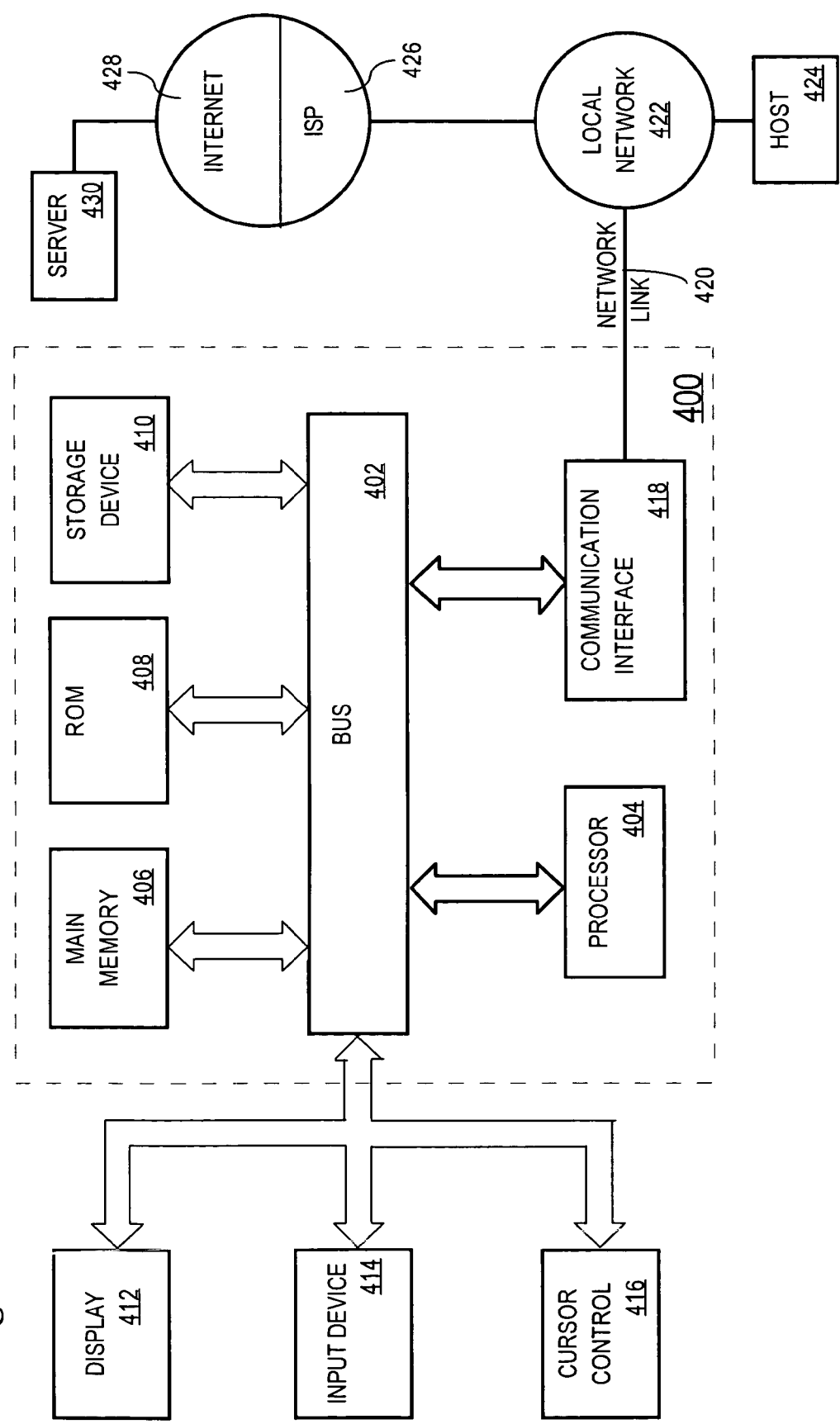
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for SNMP bulk information processing. According to one embodiment of the invention, SNMP bulk information processing is provided by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions.

The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for SNMP bulk information processing as described herein.

The received code may be executed by processor 404 as it is received, and/or stored in storage device 410, or other non-volatile storage for later execution. In this manner, computer system 400 may obtain application code in the form of a carrier wave.

4.0 Extensions And Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A method of managing information in a storage space, the method comprising the machine-implemented steps of:

receiving, at a Simple Network Management Protocol (SNMP) agent, a request for a plurality of object instances stored in the storage space, the request specifying a non-repeaters counter, a maximum repetitions counter, and one or more pairs of Object Identifier (OID) values, each pair including a starting OID value and an ending OID value, a particular condition of one or more conditions being based on a particular pair that includes a particular starting OID value and a particular ending OID value, the maximum repetitions counter indicating a number of requested values that are to be retrieved, subject to the one or more conditions, for each of a set of object instances that are specified by the request, the non-repeaters counter indicating a number of object instances specified by the request for which a single value is to be retrieved, the non-repeaters counter and the maximum repetitions counter being the only parameters specified in the request that are not OID values;

retrieving the values of one or more object instances of the plurality of object instances;

determining, during the step of retrieving the values of the one or more object instances, whether the maximum repetitions counter is reached and evaluating the particular condition based on the particular pair that includes the particular starting OID value and the particular ending OID value; and terminating the step of retrieving when the one or more conditions are satisfied even though the maximum repetitions counter is not reached;

wherein the steps of the method are performed by one or more computer systems.

2. A method as recited in claim 1, wherein:

the request is created by and sent from a SNMP management system to the SNMP agent, and wherein the storage space is a SNMP Management Information Base (MIB); and the method further comprises the SNMP agent creating and sending a response to the SNMP management system, wherein the response includes the values of the one or more object instances.

3. A method as recited in claim 1, wherein:

the particular condition of the one or more conditions is satisfied when an OID value of an object instance that is retrieved is lexicographically greater than or equal to the particular ending OID value of the particular pair of OID values that is associated with the particular condition.

4. A method of managing information in a Management Information Base (MIB), the method comprising the machine-implemented steps of:

receiving, at a Simple Network Management Protocol (SNMP) agent, a request that includes one or more pairs of Object Identifier (OID) values, each pair being represented by a starting OID value and an ending OID value, the request further including a maximum repetitions counter indicating a number of requested values that are to be retrieved for each of a set of object instances specified in the request, the request further including a non-repeaters counter that indicates a number of object instances specified by the request for which a single value is to be retrieved, the non-repeaters counter and the maximum repetitions counter being the only parameters specified in the request that are not OID values;

retrieving the values of the set of object instances, of a plurality of object instances in the MIB, that are specified in the request, the set of object instances being determined based on the one or more pairs of OID values;

determining, during the step of retrieving the values of the set of object instances, whether the number of retrieved object instance values of object instances in the set of object instances is equal to the maximum repetitions counter;

terminating retrieval, during the step of retrieving the values of the set of object instances, of the values of the set of object instances when the number of retrieved object instance values of object instances in the set of object instances is equal to the maximum repetitions counter;

determining, during the step of retrieving the values of the set of object instances, whether an OID value of an object instance that is to be retrieved next is lexicographically greater than a particular ending OID value, a particular starting OID value and the particular ending OID value representing any pair of the one or more pairs of OID values; and terminating retrieval, during the step of retrieving the values of the set of object instances, of the values of the set of object instances when the OID value of the object instance that is to be retrieved next is lexicographically greater than the particular ending OID value;

wherein the steps of the method are performed by one or more computer systems.

5. A method as recited in claim 4, wherein retrieving further comprises identifying an object instance as a member of the set of object instances if an OID value of the object instance is lexicographically greater than a specific starting OID value and lexicographically lesser than or equal to a specific ending OID value, wherein the specific starting OID value and the specific ending OID value represent a specific pair of the one or more pairs of OID values.

6. A method as recited in claim 5, wherein:
retrieving further comprises retrieving the value of the object instance; and
the method further comprises sending a response that includes the values of the set of object instances.

7. A method as recited in claim 4, wherein retrieving the values of the set of object instances further comprises:
determining whether the total size of the retrieved values of the set of object instances exceeds the maximum SNMP message size for a response message;
terminating retrieval of the values of the set of object instances when the total size of the retrieved values of the set of object instances exceeds the maximum SNMP message size for the response message.

8. A machine-readable volatile or non-volatile medium storing one or more sequences of instructions for managing information in a storage space, which instructions, when executed by one or more processors, cause the one or more processors to perform the steps of:
receiving, at a Simple Network Management Protocol (SNMP) agent, a request for a plurality of object instances stored in the storage space, the request specifying a non-repeaters counter, a maximum repetitions counter, and one or more pairs of Object Identifier (OID) values, each pair including a starting OID value and an ending OID value, a particular condition of one or more conditions being based on a particular pair that includes a particular starting OID value and a particular ending OID value, the maximum repetitions counter indicating a number of requested values that are to be retrieved, subject to the one or more conditions, for each of a set of object instances that are specified by the request, the non-repeaters counter indicating a number of object instances specified by the request for which a single value is to be retrieved, the non-repeaters counter and the maximum repetitions counter being the only parameters specified in the request that are not OID values;

retrieving the values of one or more object instances of the plurality of object instances;

determining, during the step of retrieving the values of the one or more object instances, whether the maximum repetitions counter is reached and evaluating the particular condition based on the particular pair that includes the particular starting OID value and the particular ending OID value; and terminating the step of retrieving when the one or more conditions are satisfied even though the maximum repetitions counter is not reached.

9. A machine-readable volatile or non-volatile medium as recited in claim 8, wherein:
the request is created by and sent from a SNMP management system to the SNMP agent, and wherein the storage space is a SNMP Management Information Base (MIB); and
the machine-readable medium further comprises instructions which, when executed by the one or more processors, cause the one or more processors to perform the SNMP agent creating and sending a response to the SNMP management system, wherein the response includes the values of the one or more object instances.

10. A machine-readable volatile or non-volatile medium as recited in claim 8, wherein:
the particular condition of the one or more conditions is satisfied when an OID value of an object instance that is retrieved is lexicographically greater than or equal to the particular ending OID value of the particular pair of OID values that is associated with the particular condition.

11. A machine-readable volatile or non-volatile medium storing one or more sequences of instructions for managing information in a Management Information Base (MIB), which instructions, when executed by one or more processors, cause the one or more processors to perform the steps of:
receiving, at a Simple Network Management Protocol (SNMP) agent, a request that includes one or more pairs of Object Identifier (OID) values, each pair being represented by a starting OID value and an ending OID value, the request further including a maximum repetitions counter indicating a number of requested values that are to be retrieved for each of a set of object instances specified in the request, the request further including a non-repeaters counter that indicates a number of object instances specified by the request for which a single value is to be retrieved, the non-repeaters counter and the maximum repetitions counter being the only parameters specified in the request that are not OID values;

retrieving the values of the set of object instances, of a plurality of object instances in the MIB, that are specified in the request, the set of object instances being determined based on the one or more pairs of OID values;

determining, during the step of retrieving the values of the set of object instances, whether the number of retrieved object instance values of object instances in the set of object instances is equal to the maximum repetitions counter;

terminating retrieval, during the step of retrieving the values of the set of object instances, of the values of the set of object instances when the number of retrieved object instance values of object instances in the set of object instances is equal to the maximum repetitions counter;

determining, during the step of retrieving the values of the set of object instances, whether an OID value of an object instance that is to be retrieved next is lexicographically greater than a particular ending OID value, a particular starting OID value and the particular ending OID value representing any pair of the one or more pairs of OID values; and terminating retrieval, during the step of retrieving the values of the set of object instances, of the values of the set of object instances when the OID value of the object instance that is to be retrieved next is lexicographically greater than the particular ending OID value.

12. A machine-readable volatile or non-volatile medium as recited in claim 11, wherein the instructions for retrieving further comprise instructions for identifying an object instance as a member of the set of object instances if an OID value of the object instance is lexicographically greater than a specific starting OID value and lexicographically lesser than or equal to a specific ending OID value, wherein the specific starting OID value and the specific ending OID value represent a specific pair of the one or more pairs of OID values.

13. A machine-readable volatile or non-volatile medium as recited in claim 12, wherein:
the instructions for retrieving further comprise instructions for retrieving the value of the object instance; and
the machine-readable medium further comprises instructions which, when executed by the one or more processors, cause the one or more processors to perform sending a response that includes the values of the set of object instances.

14. A machine-readable volatile or non-volatile medium as recited in claim 11, wherein the instructions for retrieving the values of the set of object instances further comprise instructions which, when executed, cause the one or more processors to perform the steps of:
determining whether the total size of the retrieved values of the set of object instances exceeds the maximum SNMP message size for a response message;
terminating retrieval of the values of the set of object instances when the total size of the retrieved values of the set of object instances exceeds the maximum SNMP message size for the response message.

15. An apparatus for managing information in a storage space, comprising:
one or more processors; and
one or more stored sequences of instructions which, when executed by the one or more processors, cause the one or more processors to perform:
executing a Simple Network Management Protocol (SNMP) agent;
receiving, at the SNMP agent, a request for a plurality of object instances stored in the storage space, the request specifying a non-repeaters counter, a maximum repetitions counter, and one or more pairs of Object Identifier (OID) values, each pair including a starting OID value and an ending OID value, a particular condition of one or more conditions being based on a particular pair that includes a particular starting OID value and a particular ending OID value, the maximum repetitions counter indicating a number of requested values that are to be retrieved, subject to the one or more conditions, for each of a set of object instances that are specified by the request, the non-repeaters counter indicating a number of object instances specified by the request for which a single value is to be retrieved, the non-repeaters counter and the maximum repetitions counter being the only parameters specified in the request that are not OID values;
retrieving the values of one or more object instances of the plurality of object instances;
determining, during retrieving the values of the one or more objects instances, whether the maximum repetitions counter is reached and evaluating the particular condition based on the particular pair that includes the particular starting OID value and the particular ending OID value; and
terminating the retrieving when the one or more conditions are satisfied even though the maximum repetitions counter is not reached.

16. An apparatus as recited in claim 15, wherein:
the request is created by and sent from a SNMP management system to the SNMP agent executing on the apparatus, and wherein the storage space is a SNMP Management Information Base (MIB); and
the one or more stored sequences of instructions further comprise instructions which, when executed by the one or more processors, cause the one or more processors to perform creating and sending a response to the SNMP management system, wherein the response includes the values of the one or more object instances.

17. An apparatus as recited in claim 15, wherein:
the particular condition of the one or more conditions is satisfied when an OID value of an object instance that is retrieved is lexicographically greater than or equal to the particular ending OID value of the particular pair of OID values that is associated with the particular condition.

18. An apparatus for managing information in a Management Information Base (MIB), comprising:
one or more processors; and
one or more stored sequences of instructions which, when executed by the one or more processors, cause the one or more processors to perform:
executing a Simple Network Management Protocol (SNMP) agent;
receiving, at the SNMP agent, a request that includes one or more pairs of Object Identifier (OID) values, each pair being represented by a starting OID value and an ending OID value, the request further including a maximum repetitions counter indicating a number of requested values that are to be retrieved for each of a set of object instances specified in the request, the request further including a non-repeaters counter that indicates a number of object instances specified by the request for which a single value is to be retrieved, the non-repeaters counter and the maximum repetitions counter being the only parameters specified in the request that are not OID values;
retrieving the values of the set of object instances, of a plurality of object instances, in the MIB that are specified in the request, the set of object instances being determined based on the one or more pairs of OID values;
determining, during retrieving the values of the set of object instances, whether the number of retrieved object instance values of object instances in the set of object instances is equal to the maximum repetitions counter;
terminating retrieval, during retrieving the values of the set of object instances of the values of the set of object instances when the number of retrieved object instance values of object instances in the set of object instances is equal to the maximum repetitions counter;

determining, during retrieving the values of the set of object instances, whether an OID value of an object instance that is to be retrieved next is lexicographically greater than a particular ending OID value, a particular starting OID value and the particular ending OID value representing any pair of the one or more pairs of OID values; and terminating retrieval, during retrieving the values of the set of object instances, of the values of the set of object instances when the OID value of the object instance that is to be retrieved next is lexicographically greater than the particular ending OID value.

19. An apparatus as recited in claim 18, wherein the instructions that cause retrieving the values of the set of object instances further comprise instructions which, when executed by the one or more processors, cause the one or more processors to perform identifying an object instance as a member of the set of object instances if an OID value of the object instance is lexicographically greater than a specific starting OID value and lexicographically lesser than or equal to a specific ending OID value, wherein the specific starting OID value and the specific ending OID value represent a specific pair of the one or more pairs of OID values.

20. An apparatus as recited in claim 19, wherein:

the instructions that cause retrieving the values of the set of object instances further comprise instructions which, when executed by the one or more processors, cause the one or more processors to perform retrieving the value of the object instance; and the one or more stored sequences of instructions further comprise instructions which, when executed by the one or more processors, cause the one or more processors to perform sending a response that includes the values of the set of object instances.

21. An apparatus as recited in claim 18, wherein the instructions that cause retrieving the values of the set of object instances further comprise instructions which, when executed, cause the one or more processors to perform:

determining whether the total size of the retrieved values of the set of object instances exceeds the maximum SNMP message size for a response message;

terminating retrieval of the values of the set of object instances when the total size of the retrieved values of the set of object instances exceeds the maximum SNMP message size for the response message.

* * * * *